United States Patent [19]

Abys et al.

[11] Patent Number: 5,135,622
[45] Date of Patent: Aug. 4, 1992

[54] ELECTROCHEMICAL SYNTHESIS OF PALLADIUM HYDROXIDE COMPOUNDS

[75] Inventors: Joseph A. Abys, Warren; Igor V. Kadija, Ridgewood; Joseph J. Maisano, Jr., Denville, all of N.J.

[73] Assignee: AT&T Bell Laboratories, Murray Hill, N J.

[21] Appl. No.: 801,140

[22] Filed: Dec. 2, 1991

[51] Int. Cl.$^5$ ............................................. C25B 1/00
[52] U.S. Cl. ................................. 204/96; 204/182.4
[58] Field of Search ............................ 204/96, 182.4

[56] References Cited

U.S. PATENT DOCUMENTS

| | | | |
|---|---|---|---|
| 3,909,381 | 9/1975 | Ehrsam et al. | 204/97 |
| 4,229,280 | 10/1980 | Horn | 204/130 |
| 4,289,597 | 9/1981 | Grenda | 204/182.4 |
| 4,324,629 | 4/1982 | Oka et al. | 204/130 |
| 4,427,502 | 1/1984 | Abys et al. | 205/242 |
| 4,468,296 | 8/1984 | Abys et al. | 205/265 |
| 4,486,274 | 12/1984 | Abys et al. | 205/242 |
| 4,493,754 | 1/1985 | Abys et al. | 205/265 |
| 4,512,963 | 4/1988 | Abys et al. | 423/387 |
| 4,911,798 | 3/1990 | Abys et al. | 205/238 |
| 4,911,799 | 3/1990 | Abys et al. | 205/265 |

FOREIGN PATENT DOCUMENTS 788439 6/1968 Canada ................................. 204/96

*Primary Examiner*—T. Tung
*Assistant Examiner*—David G. Ryser
*Attorney, Agent, or Firm*—Oleg E. Alber

[57] ABSTRACT

This invention embodies a process for synthesizing electrodialythically palladium ammine hydroxide for use in palladium plating baths. The electrodialysis takes place in a cell with a catholyte, a product and an anolyte compartments which are divided by a fluorinated anion permselective membranes. Catholyte solution readily supplies OH ions, raw starting solution contains palladium ammine ions and anions capable of migrating into the anolyte compartment, and anolyte solution readily absorbs the anions from the raw solution. Electrodes, placed in the outer compartments, are placed no more than 5 cm apart. The process is conducted with current densities of 500 ASF or less, with 200 ASF being preferable, with current efficiencies of 50 to 90 percent, with 60-80 percent being preferable, and at bath temperatures of from above freezing to 40° C., with 25°-40° C. being preferable. The electrodialysis results in a stable palladium diammine hydroxide solution containing a small fraction of starting palladium diammine compound, such as palladium diammine chloride, making the final solution readily useable either as a replenishing or a plating solution.

15 Claims, 1 Drawing Sheet

ELECTROCHEMICAL SYNTHESIS OF PALLADIUM HYDROXIDE COMPOUNDS

TECHNICAL FIELD

The invention concerns a procedure for synthesizing electrodialytically palladium ammine hydroxide for use in palladium plating baths.

BACKGROUND OF THE INVENTION

Palladium and palladium alloys have numerous uses because of their chemical inertness, excellent wearability, bright finish, high thermal and electrical conductivity and low cost as compared to gold. Many such applications involve electrical contact surfaces such as connector pins, relay or switch contacts, contact surfaces on printed wiring boards, as well as costume jewelry. For many of such applications large amounts of palladium are plated very rapidly exhausting palladium content of the bath and replenishment of palladium in the bath becomes highly desirable. A typical example is palladium plating of contact pins for electrical connectors where large numbers of pins are electroplated at high speeds. A number of patents issued to J. A. Abys et al. disclose palladium and palladium alloy compositions and procedures for their electroplating, including U.S. Pat. No. 4,427,502, issued on Jan. 24, 1984; U.S. Pat. No. 4,468,296, issued on Aug. 28, 1984; U.S. Pat. No. 4,486,274, issued on Dec. 4, 1984; U.S. Pat. No. 4,911,798, issued on Mar. 27, 1990; U.S. Pat. No. 4,911,799, issued on Mar. 27, 1990; and U.S. Pat. No. 4,493,754, issued on Jan. 15, 1985, each of which is incorporated herein by reference.

Certain class of palladium compounds, generally referred to in this application as palladium ammine hydroxide compounds, are useful in palladium plating. The exact structural formula for the palladium ammine hydroxide is not known and possibly more than one species exists in aqueous solutions corresponding generally to the formula $[Pd(NH_3)_2(OH)]_n(OH)_n$ where n may vary from 1 to 6. The palladium ammine hydroxide compound may be used to initially make up the palladium plating bath and/or to replenish the bath during the plating operation. The use of palladium ammine hydroxide in palladium plating baths has several advantages. For example, acidic anions, such as chloride ions, do not accumulate in the bath. Such accumulation of acidic anions often limits the lifetime of the bath and sometimes alters the plating characteristics of the bath during the lifetime of the bath. Also, palladium ammine hydroxide compounds neutralize hydrogen ions produced at the anode so that alkaline agents (e.g., potassium hydroxide) need not be added to the bath thus reducing accumulation of alkaline cations (e.g., potassium ions in the case of potassium hydroxide) which limit the usefulness and lifetime of the bath. Further, a constant palladium concentration being maintained by addition of palladium ammine hydroxide compound during the plating insures stability of pH for the plating bath. In turn, this leads to longer bath lifetimes and more constant plating conditions (plating rate, etc.) throughout the lifetime of the bath.

A procedure for synthesizing palladium ammine hydroxide for use in palladium plating baths is disclosed in U.S. Pat. No. 4,512,963, issued on Apr. 23, 1988 to J. A. Abys et al. This patent discloses a process for producing palladium ammine hydroxide using an anion exchange resin (OH-form). Unfortunately, this process is slow and expensive because the exchange resin is not readily reusable and recovery of the hydroxide from the resin is tedious and incomplete. Therefore, there is a need for a procedure for producing palladium ammine hydroxide in a simple and efficient manner in a form readily usable in the palladium bath and having a relatively long shelf lifetime.

SUMMARY OF THE INVENTION

This invention embodies a process for synthesizing electrodialythically palladium ammine hydroxide for use in palladium plating baths. The electrodialysis takes place in a cell with a catholyte, a product and an anolyte compartments which are divided by a fluorinated anion permselective membranes. Catholyte solution readily supplies OH ions, raw starting solution contains palladium ammine ions and anions capable of migrating into the anolyte compartment, and anolyte solution readily absorbs the anions from the raw solution. Electrodes, placed in the outer compartments, are placed no more than 5 cm apart. The process is conducted with current densities of 500 ASF or less, with 200 ASF being preferable, with current efficiencies of 50 to 90 percent, with 60–80 percent being preferable, and at bath temperatures of from above freezing to 40° C., with 25°–40° C. being preferable. The electrodialysis results in a stable palladium diammine hydroxide solution containing a small fraction of starting palladium diammine compound, such as palladium diammine chloride, making the final solution readily useable either as a replenishing or plating solution.

DETAILED DESCRIPTION

Figure 1:
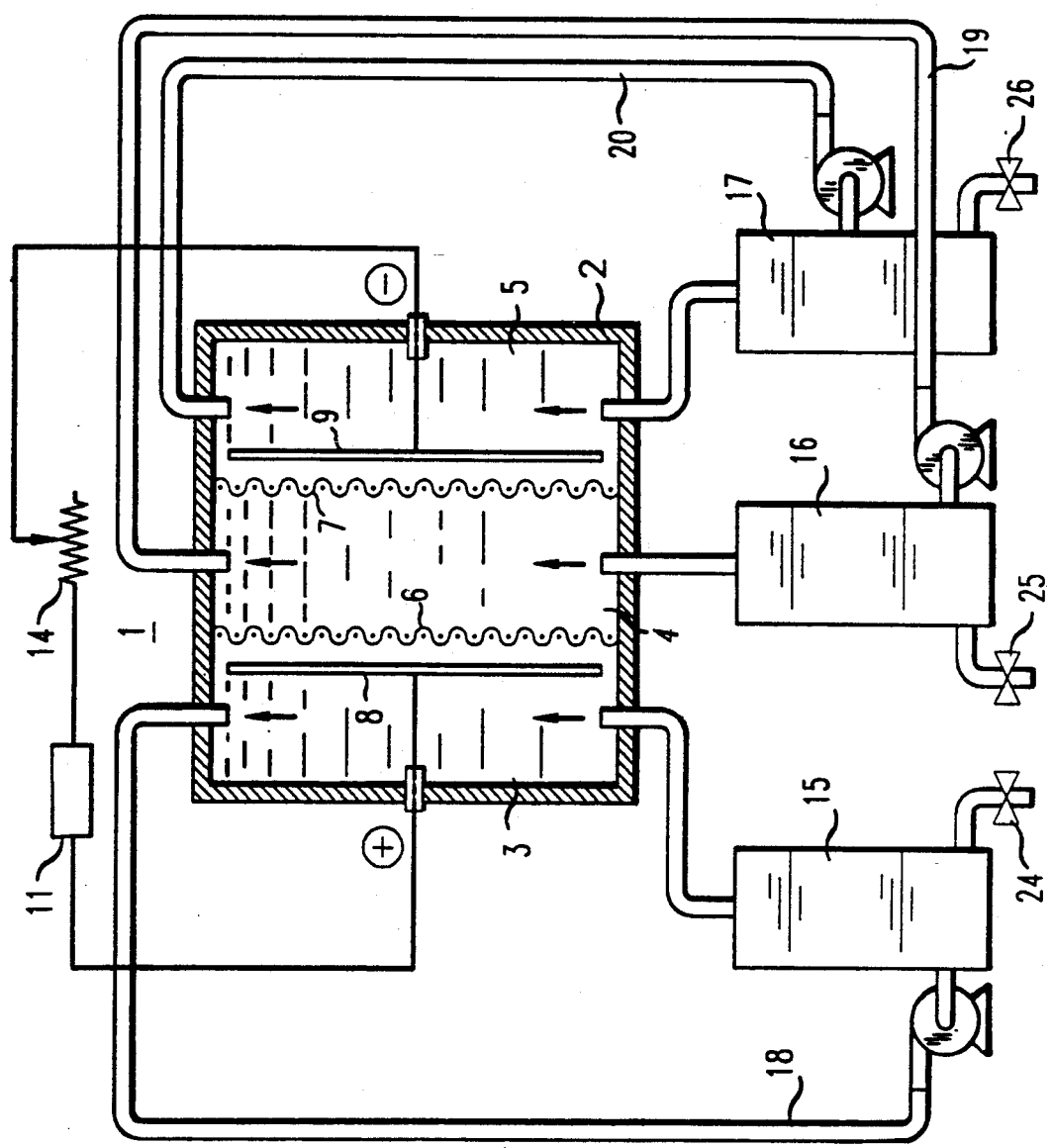
FIG. 1 is a schematic representation of an electrodialysis apparatus for practicing the invention.

Formation of palladium ammine hydroxide according to this invention is conducted by electrodialysis in an electrodialysis cell by means of ion-exchange membranes. Although the art of electrodialysis utilizing ion-exchange membranes is known, a particular combination of equipment, membrane, processing parameters, and specific electrodialysis in accordance with this invention makes it possible to produce palladium ammine hydroxide which may be represented by a general formula $[Pd(NH_3)_2(OH)]_n(OH)_n$ with n ranging from 1 to 6. A preferred form is $[Pd_2(NH_3)_4(OH)_2](OH)_2$. This compound can be made from different readily available palladium compounds conventionally used in palladium plating, and, when produced in accordance with this invention, it is stable and can be stored over long period of time without decomposition or deterioration. Without specific design and process parameters described below, the hydroxide formation is inefficient and at best gives an unstable palladium ammine hydroxide which typically drops out of solution as soon as it is formed, even within the cell.

An electrodialysis cell for use in practicing this invention consists of three compartments including a catholyte compartment, an anolyte compartment and a middle or product compartment separated from the catholyte and the anolyte compartments by anion permselective membranes. Each compartment has its own circulation in and out of the cell. In the preferred embodiment, each cell is also provided with a separate holding tank. This enables continuous control of the process while the cell is in operation so that each compartment can be monitored concerning composition and temperature of the liquid.

The catholyte compartment contains a material which readily supplies OH ions. The product compartment originally is charged with raw material to be converted into a desired ammine hydroxide form. A large variety of raw materials may be used. Especially suitable are raw materials generally referred to as palladium diammine compounds which include $Pd(NH_3)_2Cl_2$, $Pd(NH_3)_2Br_2$, $Pd(NH_3)_2I_2$, $Pd(NH_3)_2SO_4$, $Pd(NH_3)_2(NO_3)_2$, etc. Other palladium compounds may be used in the stated form or can be converted into $Pd(NH_3)_4Cl_2$ by known procedures. For example, metallic palladium or $PdCl_2$ can be converted into $Pd(NH_3)_4Cl_2$, a form suitable for use in palladium plating. The anolyte compartment contains a solution of a material which shall exchange its anions for anions of the raw material. In the product compartment the raw material is converted into a desired hydroxide form, such as palladium tetrammine hydroxide, $[Pd_2(NH_3)_4(OH)_2](OH)_2$. This is accomplished by transferring OH ions from the catholyte compartment through an anion exchange membrane into the product compartment containing the raw material. For each OH ion entering the product compartment, one anion of the raw material is transferred across the other anion exchange membrane into the anolyte compartment. The replaced anions of the raw material migrate through the anolyte side membrane and become part of the anolyte material, for example by another exchange of these anions for the anions of the anolyte. Thus, the process consists of replacing anions of the raw material with OH ions by means of two anion exchange membranes.

The process is based on an appropriate combination of cell design, membrane quality and operating parameters. The cell design provides for a short distance between the electrodes and still enables the placement of the three compartments needed for the cell operation. It is a requirement of this invention that the distance between the electrodes shall not exceed 5 cm. Since in such a cell the volume of the product compartment would be small, the product volume needed in each batch is achieved by an outside reservoir with continuous recycling of the raw material being electrolyzed. Regular maintenance and quality control of the content of each of the three compartments enables a quality operation.

A large variety of anion-exchange membranes may be useful in the practice of the invention. These membranes permit selective passage of anions to the substantial exclusion of cations. Only high-grade fluorinated anion exchange membranes resistive to high alkaline environment, such as up to pH 14, are useful for this electrodialysis. When chloride-containing raw material is used, the membranes should be also resistive to an active chlorine. Conventional organic backbone membranes are quickly destroyed by the active chlorine which is formed with interaction of $Cl_2$ with $OH^-$ or $H_2O$. In this invention, Fluorinated-Anion Exchange Membranes TOSFLEX ® manufactured by Tosoh Corp., 1-11-39 Akasaka, Minato-Ku, Tokyo 107, Japan, are being used as the preferred type of the anion permselective membranes.

The operating parameters are selected so that the process is low temperature, fast and highly efficient. These are three very important parameters for performance optimization. At low temperature ammonia partial pressure is low and therefore the rate of ammonia evaporation is reduced. This results in product stability as well as in an environmentally sounder operation. Temperatures ranging from just above the freezing temperature of the solution to 40° C. are operable, with temperatures from 25° to 40° C. being preferable and from 30° to 40° C. being most preferred. The process duration while performing the electrolysis is another important factor. The process should be fast, so that the original raw material reaches 80-90 percent conversion within a period of 5-6 hours or less. A lengthy process also leads to excessive ammonia evaporation while the product is being formed. This can cause the product decomposition even before the process completion. Current densities of the order of 500 ASF and less, with 200 ASF being an optimum, are suitable for the processing. Current efficiency in palladium ammine hydroxide manufacturing ranging from 50 to 90 percent, with 60 to 80 percent being preferable, also contributes to product stability.

In FIG. 1 is shown a schematic representation of an electrodialysis cell. For convenience, dimensions of various parts of the apparatus are shown out of scale. The cell generally denoted as 1 includes a container 2, divided into three compartments 3, 4 and 5, by two vertical walls composed at least in part of anion permselective membranes, 6 and 7, an anode electrode, 8, in compartment 3, and a cathode electrode, 9, in compartment 5. A source of a DC, 11, is connected by leads, 12 and 13, to respective electrodes, the magnitude of the electrodialysis current being controlled by current control means, 14. Compartments 3, 4 and 5 form electrodialysis cell 1 with middle or product compartment 4 interposed between anolyte and catholyte compartments 3 and 5, respectively, and with anion permselective membranes 6 and 7 separating the anolyte and the catholyte compartment, respectively, from the product compartment. For efficiency reasons, electrodes 8 and 9 are preferably coextensive in area to the respective membrane area. The electrodes are of material which is non-consumable in the respective solutions. Typically, the anode electrode is of platinum or platinum on titanium or on niobium, and the cathode electrode is of stainless steel or nickel.

The synthesis for the preparation of the palladium ammine hydroxide compounds may be outlined as follows. Product compartment 4 is filled with a starting raw solution which is to be converted by the electrodialysis into a suitable form of palladium ammine hydroxide. A variety of bath chemistries may be used in the practice of the invention. Generally, the bath should contain a source of palladium and be sufficiently conducting to permit reasonable electrodialysis rates. Typical are ammonia-based plating solutions often with palladium complexed with ammonia, but other types of palladium plating solutions are also useful. Starting palladium diammine compounds recited hereinbefore may be used as starting raw materials, with $Pd(NH_3)_4Cl_2$ being a preferred starting material. Catholyte compartment 5 contains suitable catholyte which provides supply of hydroxyl anions in an aqueous solution. A variety of bases are useful, including weak and strong bases. Such catholytes include KOH, NaOH, $NH_4OH$, with NaOH and KOH being preferred. Concentration of base anions should be as high or higher than the concentration of the anions of the raw material, so as to avoid a reverse migration of the latter. Anolyte compartment 3 is filled with a suitable anolyte which may be either alkaline or neutral and which will permit migration of anions from the product compartment through the permselective membrane.

Because hydroxyl ions are used in the electrodialysis process, the anolyte solution should, preferably, contain hydroxyl ions and generally be an aqueous basic solution. Anolytes which would be suitable include KOH, NaOH, $Na_2SO_4$, $Na_2NO_3$, $K_2NO_3$, with NaOH and KOH being preferred with pH of 8 or higher. Often it is preferred that the cation of the anolyte be the same as the cation used in the buffer in the palladium electroplating bath. For example, if a potassium phosphate buffer system is used in the bath, potassium hydroxide is preferably used in the anolyte solution.

In the preferred embodiment, the procedure is illustrated using $Pd(NH_3)_4Cl_2$ as the starting raw material. This solution which is probably in the form of $Pd(NH_3)_4^{+2}$ ions and $Cl^-$ ions, is exposed to an anion exchange to replace the chloride ions in the solution with OH- ions. Either the batch method or continuous method may be used. The electrodialysis process involves passing current from anode to cathode through solution to be converted to the ammine hydroxide. Upon application of a potential to anode and cathode electrodes 8 and 9, respectively, $OH^-$ anions migrate through anion perm-selective membrane 7 by the electrodialysis process from catholyte compartment 5 into product compartment 4 with simultaneous movement of $Cl^-$ anions from the palladium compound of the raw solution through membrane 6 into anolyte compartment 3.

In accordance with this invention, the distance between the anode and the cathode should be small, preferably not greater than 5 cm, most preferably 3 cm or less. This reduces the resistance of the path between the cathode and the anode which, in turn, reduces potential requirement for the dialysis and avoids overheating of the solution thus permitting the use of lower processing temperatures without cooling. Because of this requirement the volume of the starting solution in the product compartment would be also small, resulting in conversion of the raw material to palladium ammine dioxide in very short time. To avoid frequent interruption of the process to remove the synthesized solution from the product compartment and to restock the cell with fresh raw material, the apparatus includes holding tanks 15, 16, and 17, each of which is much larger in volume than the related compartment of the cell. Each holding tank is connected by an individual pipe and pump system, 18, 19 and 20, respectively, to related compartments of the cell. Each tank is filled with the same solution as the solution in the related compartment. The solution is circulated through the compartments by means of pumps 21, 22 and 23, in each pipe-and-pump system 18, 19 and 20, respectively. The liquids are introduced into each respective compartment at the bottom and are withdrawn at the top of the compartment. Alternatively, both the inflow and outflow may be at the top of the compartment. Outflow on the bottom is possible but is not practical due to formation of sizeable amounts of foam on the top of the solution as the result of the electrodialysis, which should be withdrawn to avoid reduction in the efficiency of the process. Each of the tanks is also provided with an outlet valve, 24, 25 and 26, respectively, for removal of the spent or reprocessed solution, as needed.

In the exemplary embodiment, product compartment 4 and tank 16 are filled with an aqueous solution of $Pd(NH_3)_4Cl_2$ containing 65 to 75 g/l chloride and having pH of 7.5-9.0. Catholyte compartment 5 and tank 17 are filled with a 2.0-3.0M NaOH solution and anolyte compartment 3 and tank 15 with 2.0-3.0M NaOH solution. The electrodialysis is conducted until the chloride content in the product compartment drops to about 5-10 g/l, preferably 8-10 g/l, level. Simultaneously, the chloride content in the anolyte compartment rises from between 0 and less than 0.01M to over 1M. At high chloride level in the anolyte, e.g., exceeding 35 g/l, the anolyte should be replaced with a fresh batch of caustic solution.

Typically, the processing is continued until chloride content in product compartment 4 and holding tank 16 drops from 65-75 g/l to 5-10 g/l, that is preferably 8-10 g/l. The electrodialysis of the raw solution is not continued to completion, that is, not to a complete elimination of chloride ions in the final product. Thus, when the solution is withdrawn from tank 16, the solution shall be predominantly palladium diammine hydroxide with a small fraction, e.g. 6 to 15 wt. percent, of the solution being a chloride-containing palladium diammine compound. This limit in the reduction of the chloride content is desirable to avoid reduction in the process efficiency. So long as the chloride content in the raw solution is not entirely eliminated, providing sufficient electrolyte action needed for the electrodialysis, the process efficiency remains high. Low chloride levels, such as 5 g/l or lower, are to be avoided since at such levels OH ions become the predominant species being transferred across membrane 6 separating the product and the anolyte compartments. This tends to establish a steady state where equivalent amounts of OH ions are being transferred across both membranes 6 and 7 simultaneously. Such condition leads to zero efficiency of the process, and should be avoided. Additionally, when the palladium ammino hydroxide solution is used in the plating bath, low chloride content in the raw solution product is sufficient to avoid chloride build-up in the electroplating cell, while providing sufficient electrolyte action needed for electroplating.

An example of a preferred embodiment of the process according to the invention as disclosed in Example 1 below. This exemplary embodiment is compared with other variants of the process as disclosed in Examples 2-4. The latter differ by at least such parameters as the distance between the electrodes and temperature of the process considered important in practicing the invention. All of the examples were run on a batch production basis.

EXAMPLE I

| Process design parameters: | |
|---|---|
| Membrane | TOSFLEX ® IE-SF 34-18 |
| Membrane area: | 100 cm 2 |
| Anode area: | 100 cm 2 |
| Cathode area: | 100 cm 2 |
| Anode-Cathode Distance: | 3 cm |
| Anolyte volume: | 100 ml (in cell) |

|   |   |
|---|---|
| Catholyte volume: | 1000 ml (out of cell) |
|  | 100 ml (in cell) |
|  | 1000 ml (out of cell) |
| Product volume: | 100 ml (in cell) |
|  | 4000 ml (out of cell) |
| Typical process performance: | |
| Current: | 20 A |
| Voltage: | 6 ± 1 V |
| Process temperature: | |
|  | anode compartment: 36° C. |
|  | cathode comp. 36° C. |
|  | product comp. 36° C. |
| No cooling was necessary. | |
| Raw solution starting chloride level | 65–75 gpl |
| Process duration to bring chloride level to 10 gpl | 4 hours/1 |
| Process efficiency: | 60–70% |
| Product concentration: | 99–101 gpl Pd |
| Product stability: | over 3 months (no solids were observed) |
| Membrane utilization: | over 200 oz/SF of membrane |

A combination of high efficiency, low temperature and low voltage results in a superior performance of the cell. The cell was operated at its optimum at 20 Amperes total, which corresponds to 200 ASF. Lower current densities, such as 100 ASF and 50 ASF permitted lower operating temperatures, 30° C. and 28° C., respectively, without he necessity of cooling the solution, but resulted in longer processing times, 8 hours and 16 hours, respectively. However, due to lower operating temperatures, the extended processing period did not affect the product quality.

For comparison, below are given three comparative process examples which do not meet design details necessary to achieve a commercially acceptable process and to produce a stable product.

EXAMPLE 2

(Comparative)

|   |   |
|---|---|
| Process design parameters: | |
| Membrane | TOSFLEX ® IE-SF-34-18 |
| Membrane area: | 100 cm 2 |
| Anode area: | 100 cm 2 |
| Cathode area: | 100 cm 2 |
| Anode-Cathode distance: | 7 cm |
| Anolyte volume (2M KOH): | 100 ml |
|  | 1000 ml (out of cell) |
| Catholyte volume: | 100 ml (in cell) |
|  | 1000 ml (out of cell) |
| Product volume: | 300 ml (in cell) |
|  | 4000 ml (out of cell) |
| Typical process performance: | |
| Current: | 20 A |
| Voltage: | 9 ± 1 V |
| Process temperature: | |
| anode comp. to: | 45° C. |
| cathode compt.: | 60 |
| product compt.: | 56 |

Cooling was necessary. Cooling performed in holding compartment (out of cell) with glass coil/cold water system.

|   |   |
|---|---|
| Raw solution starting chloride level | 65–75 gpl |
| Process duration to bring chloride level to 10 gpl | 8 hours/1 |
| Process efficiency: | 55% |
| Product concentration: | 101 gpl Pd |
| Product stability: | 1 to 5 days (formation of solids) |
| Membrane utilization: | 10 oz/SF membrane |

Except for greater distance between the electrodes and larger size of the product cell, this example was conducted under process parameters similar to those of Example 1. Greater distance between the electrodes, led to a need for larger volume of product compartment and higher starting voltage. This led to higher operating temperatures, requiring cooling, and to lower process efficiency, lower product stability and lower membrane utilization.

EXAMPLE 3

(Comparative)

|   |   |
|---|---|
| Process design parameters: | |
| Membrane | ESC-7001 |
| Membrane area: | 150 cm 2 |
| Anode area: | 100 cm 2 |
| Cathode area: | 100 cm 2 |
| Anode-Cathode distance: | 7 cm |
| Anolyte volume (2M KOH): | 250 ml |
| Catholyte volume (2M KOH): | 1000 ml |
| Product volume: | 500 ml |
| Typical process performance: | |
| Current: | 20 A |
| Voltage: | 9 ± 1 V |
| Process temperature: | |
| anode compt.: | 45° C. |
| cathode compt.: | 60 |
| Product compt.: | 56 |

Cooling was necessary. Cooling was performed in holding compartment (out of cell) with glass coil/cold water system.

|   |   |
|---|---|
| Raw solution starting chloride level | 65–75 gpl |
| Process duration to bring chloride level to 10 gpl | 5 hours/1 |
| Process efficiency: | 90% |
| Product concentration: | 101 gpl Pd |
| Product stability: | 1 to 5 days (formation of solids) |
| Membrane utilization: | 6 oz/SF membrane |

Although a high efficiency was achieved temporarily, the membrane became soft and wrinkled during the first run. Deposits of palladium metal reduced within the membrane caused shorts and operational inefficiencies.

The membrane could not be reused. The membrane was a non-fluorinated, methacrylate membrane commercially available from the Electrosynthesis Company Incorporated, East Amherst, N.Y., 14051, U.S.A.

EXAMPLE 4

| Process design parameters: | |
| --- | --- |
| Membrane | TOSFLEX ® IE-SF4 |
| Membrane area: | 150 cm 2 |
| Anode area: | 100 cm 2 |
| Cathode area: | 100 cm 2 |
| Anode-Cathode distance: | 7 cm |
| Anolyte volume (2M KOH): | 250 ml |
| Catholyte volume (2M KOH): | 1000 ml |
| Product volume: | 500 ml |
| Typical process performance: | |
| Current: | 20 A |
| Voltage: | 9 ± 1 V |
| Process temperature: | |
| anode compt.: | 45° C. |
| cathode compt.: | 60 |
| product compt.: | 56 |

Cooling was necessary. Cooling was performed in holding compartment (out of cell) with glass coil/cold water system.

| Raw solution starting chloride level | 65–75 gpl |
| --- | --- |
| Process duration to bring chloride level to 10 gpl | 8 hours/1 |
| Process efficiency: | 55% |
| Product concentration: | 101 gpl Pd |
| Product stability: | 1 to 5 days (formation of solids) |
| Membrane utilization: | 10 oz/SF membrane |

In Example 4, after three batch productions in duration of 5–6 hours, voltage exceeded 18 V. Majority of the membrane active groups have been eliminated and the membrane resistance has climbed from typical 0.2 volts up to 2 volts causing the overall cell voltage to increase. Thus, although the membrane had demonstrated a longer life, the cell design inefficiency, including excessive heating, had made the cell operation short and inefficient.

The replenishment solution for use in plating bath may contain other ingredients besides the ammine hydroxide compound. Typical substances might be buffers, surface conditioning compounds, conducting salts, etc. For the most part, the solution would consist essentially of the palladium diammine hydroxide compound discussed above. Although this compound seems most suitable for use in electroplating processes, it may under suitable circumstances be used to supply palladium for electroless baths, sensitizing solutions, etc.

We claim:

1. A method of synthesising palladium hydroxide compounds in an electrodialysis cell comprising an anolyte compartment, a catholyte compartment, and a product compartment separated from the catholyte and the anolyte compartment by membranes, and an anode and a cathode electrode positioned in the catholyte and the anolyte compartments, respectively, which comprises providing the catholyte compartment with a solution containing a supply of hydroxyl ions, providing the product compartment with a raw starting material containing palladium ammine ions and anions capable of migrating into the anolyte compartment when a current is passed between the cathode and the anode, and providing the anolyte compartment with a solution which would readily absorb the anions from the raw solution, characterized by using a fluorinated anion-permselective membrane, placing the cathode and the anode electrodes adjacent to their respective membranes such that the cathode and the anode electrodes are spaced a distance of 5 cm or less each from another, maintaining the temperature of the process within a range of from above freezing temperature of the solution to 40° C., and conducting the electrodialysis with current density of less than 500 ASF and with a current efficiency ranging from 50 to 90 percent.

2. The method of claim 1, in which the electrolysis is conducted with current density of 200 ASF or less.

3. The method of claim 1, in which the distance between the cathode and the anode electrodes is 3 cm.

4. The method of claim 1 in which said temperature is 36° C.

5. The method of claim 1 in which said starting raw solution is selected from palladium ammine compounds.

6. The method of claim 5 in which said raw material is chosen from the group consisting of $Pd(NH_3)_2Cl_2$, $Pd(NH_3)_2Br_2$, $Pd(NH_3)_2I_2$, $Pd(NH_3)_2SO_4$, and $Pd(NH_3)_2(NO_3)_2$.

7. The method of claim 1, in which said raw material is $Pd(NH_3)_4Cl_2$.

8. The method of claim 1, in which said catholyte comprises at least one of hydroxyl containing solutions chosen from the group consisting of KOH, NaOH and $NH_4OH$ and has a pH of at least 8, and said anolyte comprises at least one solution chosen from the group consisting of KOH, NaOH, $Ha_2SO_4$, $Na_2SO_3$ and $K_2NO_3$.

9. The method of claim 8, in which at least said catholyte comprises at least one of KOH and NaOH.

10. The method of claim 8, in which the anolyte has a pH of at least 8.

11. The method of claim 1, in which said catholyte comprises NaOH, said raw material comprises $Pd(NH_3)_4Cl_2$, said anolyte comprises NaOH, the cathode and anode electrodes are spaced a distance of 3 cm each from another and in which the potential of 6±1 V and current of 20 mA is applied between the cathode and the anode.

12. The method of claim 11, in which the electrodialysis is discontinued when the concentration of the chloride ions in the product compartment falls to within a range of from 6 to 15 weight percent of the original amount.

13. The method of claim 11, in which the raw material initially contains 65–75 g/l chloride and the process is discontinued when the level of chloride in the product compartment falls down to 5–10 g/l of chloride.

14. The method of claim 12, in which the process is discontinued when the level of chloride in the product compartment falls to 8–10 g/l.

15. The method of claim 1, in which the volume of the liquid being processed is increased by providing each compartment with an outside holding tank and circulating the solution between each compartment and its holding tank.

* * * * *